Nov. 8, 1949     C. GUDMUNDSEN     2,487,651
MARSHMALLOW AND WIENER TOASTER
Filed Jan. 24, 1948
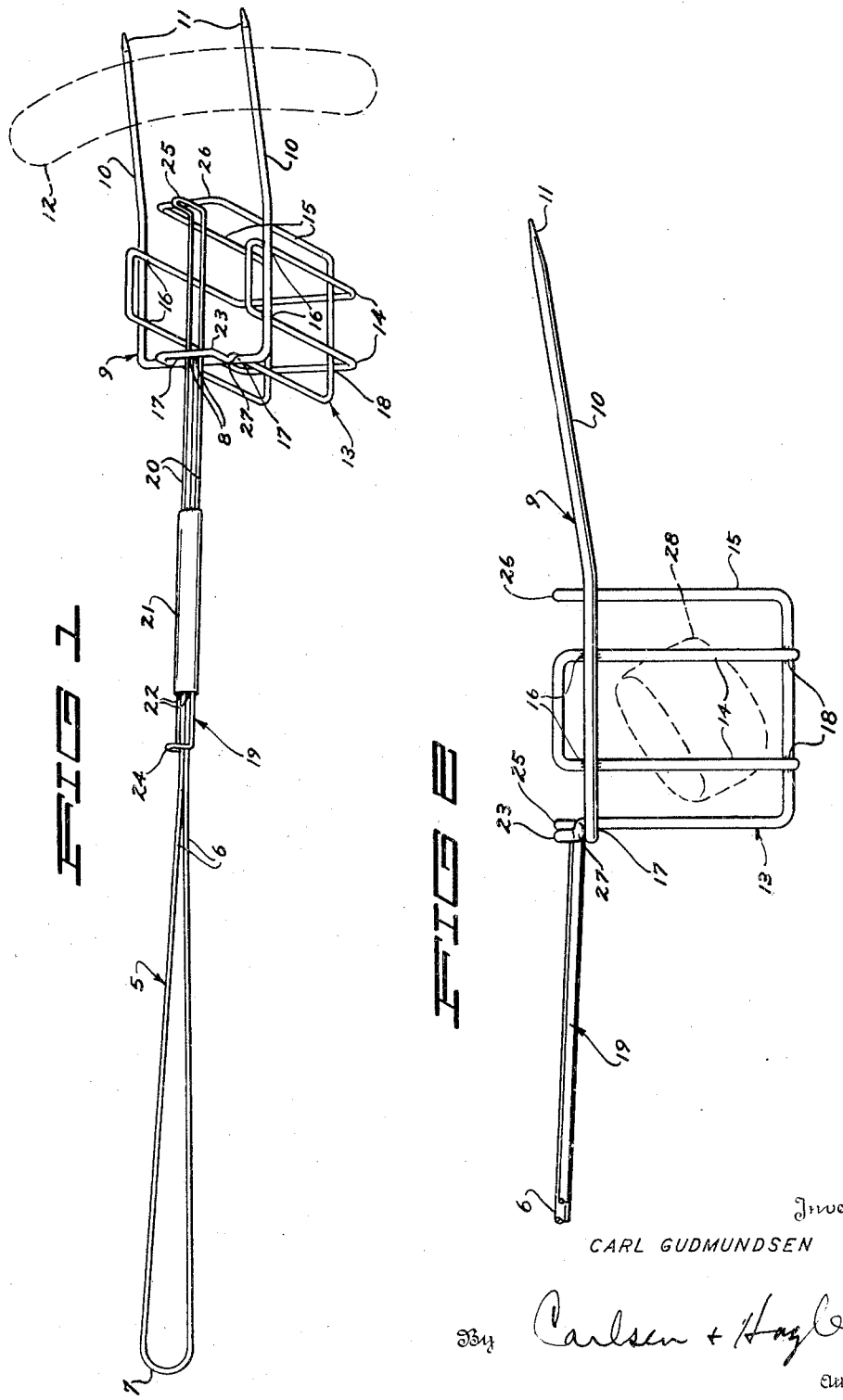
Inventor
CARL GUDMUNDSEN
By Carlsen + Hazle
Attorney Patented Nov. 8, 1949

2,487,651

UNITED STATES PATENT OFFICE 2,487,651

MARSHMALLOW AND WIENER TOASTER

Carl Gudmundsen, Minneapolis, Minn.

Application January 24, 1948, Serial No. 4,135

9 Claims. (Cl. 99—394)

This invention relates to an improved combination marshmallow and wiener or steak toaster or roaster for use in the home or on picnic outings.

Many implements of this general nature have been devised and they are in general satisfactory for holding wieners or steaks for roasting and broiling but none of such devices have, to my knowledge, been at all satisfactory for toasting marshmallows. These, due to their nature, are difficult to toast properly at best and when impaled on the usual wiener fork tines, they generally fall into the fire or dangle in such manner as to come apart and cause the user to attempt their salvage with the fingers with a resulting painful burn. Then too, even if they stay in place, their removal onto a plate is a difficult and usually sticky task.

Bearing in mind the foregoing and other well known difficulties in the proper toasting of the marshmallows, it is the primary object of my invention to provide an implement, having forks for roasting wieners, steaks and the like, but which embodies a basket-like enclosure into which the marshmallows may be placed and held as they are toasted, and from which they may be removed onto a plate without touching them with the hand. Another object is to provide an implement having a basket with a readily manipulated closure which may be opened to insert or remove the marshmallows and in which basket the marshmallows may be tumbled about as they are held over the fire and toasted, to ensure evenness in the toasting and prevent sticking. In furtherance of this object, the basket is so made that there are no obstructions or projections such as might cause the marshmallows to stick.

Other objects and advantages of my invention will be made apparent in the course of the following specification, reference being had therein to the accompanying drawing wherein:

Fig. 1 is a perspective view of the combination marshmallow and wiener toaster of my invention.

Fig. 2 is an enlarged, fragmentary side elevation.

Referring now more particularly and by reference characters to the drawing, 5 designates generally the handle of my device and as shown, this handle is formed of a length of heavy wire doubled back on itself and with its respective arms 6 converging from a rounded end 7 and extending parallel to each other in contact for some distance. The extremities 8 of these arms 6 are welded or otherwise suitably secured at the center of a generally U-shaped fork element 9 having spaced parallel tines 10 pointed at their ends 11. Thus, the fork element 9 forms a rigid extension of the handle 5 and it will be readily understood that one or more wieners, as indicated by the dotted lines 12 in Fig. 1, may be impaled upon one or both tines 10 and held thereon for roasting over the fire. It is here to be noted that I contemplate making the handle 5 some thirty inches in length so that the hand will be far enough from the fire for comfort, and without requiring a wooden handle which would only add needless expense. The rounded end 7 of the handle further will thus serve as a convenient means for hanging the implement upon a nail or hook when not in use, as will be understood.

The fork element 9 supports and forms part of a basket, or basket-like enclosure designated generally at 13 and while this basket, as it will be hereinafter called, may be made up in any fashion, I here show it as comprising two U-shaped, crossed wire frames 14 and 15, each having spaced side portions formed of wire. The transverse frame 14 is welded or otherwise suitably secured near its upper ends at 16 to the fork tines 10 while one upper end of the other frame 15 is similarly secured at 17 to the bight portion of the fork to opposite sides of the handle extremities 8, the other end of this frame extending up between the fork tines as clearly shown. This construction forms a cube-shaped basket open at its top, and of course largely open throughout for exposure of its contents to the heat of the fire. The frames 14 and 15 are also welded together where they cross at the bottom of the basket as shown at 18.

A sliding closure is provided for the top of the basket and comprises a slide 19 in the form of a double length of wire, the two arms 20 of which are parallel and spaced so as to nicely and slidably fit alongside the arms 6 of the handle 5. A metal band or ferrule 21 is formed around the four wires and secured at 22 to the arms 6 and thus slidably supports the slide 19 for endwise movement with respect to the handle. The slide may thus be projected out beneath the closed upper end 23 of the basket frame 15 and out over the basket to close it as seen in Fig. 1, or pulled back to open the basket as seen in Fig. 2, and for convenience in thus manipulating the slide its end, remote from the basket, is turned up in the form of a thumb-piece 24. The opposite end of the slide also has an upturned stop 25 adapted to contact the closed end 26 of the basket frame 15 when the basket is covered by the slide, and likewise to contact the aforesaid and other closed end 23 of the frame as the basket is uncovered, this stop thus limiting the opposite movements of the slide as will be evident. Attention is called to the fact that the upper end portion of the basket frame 15, above the point at which it is secured to the fork is offset, as designated at 27, so that when the basket is opened the stop 25 will stand flush with the inside of the basket as clearly shown in Fig. 2.

In use, the basket may be opened by withdrawing the slide 19 and a marshmallow, as in dotted lines 26, dropped into the basket and the slide closed. The implement may then be projected over the fire and by turning and shaking it, the marshmallow will be tumbled about in the basket so that not only will all surfaces be evenly toasted but the marshmallow will be prevented from sticking. When done, the marshmallow may be dropped out on a plate by pulling back the slide and inverting the basket, all without use of the fingers. The offset 27 is important, as is the general smooth conformation of the basket as a whole, in keeping the marshmallow from sticking, there being no projections or obstructions on which the marshmallow may cling. Thus, it will be seen that I have completely solved the problems hereinbefore mentioned in the clean and convenient toasting of these delicacies and have provided an extremely simple and practical tool for my purposes.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a marshmallow toaster of the character described, a handle, and a basket-like enclosure on the handle of a shape and size for holding a marshmallow as it is toasted and wherein the marshmallow may be tumbled about by manipulation of the handle so that the marshmallow will be evenly toasted on all sides and will not stick to the said enclosure.

2. In a marshmallow toaster of the character described, a handle, and a basket-like enclosure on the handle of a shape and size for holding a marshmallow as it is toasted and wherein the marshmallow may be tumbled about, as it is toasted, by manipulation of the handle, and said toaster also having a fork upon which a wiener or the like may be impaled for roasting.

3. In an implement of the character described, a handle, a basket in one end of the handle for loosely holding marshmallows while they are toasted, and a slidable closure means for one side of the basket.

4. In an implement of the character described, an elongated handle having a hand grip portion at one end, a basket at the other end of the handle adapted to loosely contain a marshmallow as it is toasted, a sliding closure for one side of the basket, and said closure having a portion slidable along the handle for its actuation.

5. In an implement of the character described, an elongated handle having a hand grip portion at one end, a basket at the other end of the handle adapted to loosely contain a marshmallow as it is toasted, a sliding closure for one side of the basket and including a portion slidably connected to the handle for its actuation, and stop means for engaging the closure and limiting sliding movement of the closure in opposite directions.

6. In an implement of the character described, an elongated handle having a hand grip portion at one end, a basket at the other end of the handle adapted to contain a marshmallow as it is toasted, a sliding closure for one side of the basket and including a portion slidably connected to the handle for actuation from a point remote from the basket, and a wiener fork forming part of the basket.

7. In an implement of the character described, an elongated handle of wire doubled back on itself and having a rounded end and diverging arms at one end forming a hand grip and said arms lying in contact at the other end, a U-shaped fork fastened to and extending from said other end of the handle, a wire basket having a bottom and upturned sides and supported from the fork, a slide having sides slidable along the end of the handle adjacent the fork, a ferrule holding the slide on the handle, and a thumb piece on one end of the slide by which it may be moved out over the top of the basket or pulled back to open the basket.

8. In an implement of the character described, an elongated handle of wire doubled back on itself and having a rounded end and diverging arms at one end forming a hand grip and said arms lying in contact at the other end, a U-shaped fork fastened to and extending from said other end of the handle, a wire basket having a bottom and upturned sides and supported from the fork, a slide having sides slidable along the end of the handle adjacent the fork, a ferrule holding the slide on the handle, a thumb piece on one end of the slide by which it may be moved out over the top of the basket or pulled back to open the basket, and the said slide also having a stop adapted to engage opposite upper sides of the basket to limit the opposite opening and closing movements of the slide.

9. In an implement of the character described, an elongated handle of wire doubled back on itself and having a rounded end and diverging arms at one end forming a hand grip and said arms lying in contact at the other end, a U-shaped fork fastened to and extending from said other end of the handle, a wire basket having a bottom and upturned sides and supported from the fork, a slide having sides slidable along the end of the handle adjacent the fork, a ferrule holding the slide on the handle, a thumb piece on one end of the slide by which it may be moved out over the top of the basket or pulled back to open the basket, the said slide also having a stop adapted to engage opposite upper sides of the basket to limit the opposite opening and closing movements of the slide, and the basket being offset where engaged by the stop in its opened position whereby the slide may clear the basket and allow the removal of its contents without interference from the slide.

CARL GUDMUNDSEN.

REFERENCES CITED

The following references are of record in the file of this patent:

UNITED STATES PATENTS

| Number | Name | Date |
|---|---|---|
| 587,470 | Bible | Aug. 3, 1897 |
| 2,102,818 | Rhew | Dec. 21, 1937 |
| 2,317,388 | Lako | Apr. 27, 1943 |